United States Patent

Heil et al.

[11] 3,891,603
[45] June 24, 1975

[54] REMOVING HEAT OF REACTION IN COPOLYMERIZATION OF ETHYLENE IN AQUEOUS DISPERSION

[75] Inventors: Eduard Heil, Limburgerhof; Karl Kuchner, Ludwigshafen; Wolfgang Sliwka, Weinheim; Harald Smits, Ludwigshafen, all of Germany

[73] Assignee: BASF Aktiengesellschaft, Ludwigshafen/Rhine, Germany

[22] Filed: Dec. 28, 1973

[21] Appl. No.: 429,090

[30] Foreign Application Priority Data
Jan. 3, 1973 Germany............................ 2300111

[52] U.S. Cl.................... 260/63 R; 260/78.5 BB; 260/78.5 HC; 260/79.7; 260/80.3 N; 260/85.5 HC; 260/86.7; 260/87.3; 260/87.5 C; 260/88.1 PC
[51] Int. Cl............................ C08f 1/11; C08f 1/98
[58] Field of Search...........260/78.5 BB, 78.5 HC, 260/85.5 HC, 87.3, 86.7, 94.9, 88.1 PC, 260/80.3 N, 87.5 C, 63 R, 79.7

[56] References Cited
UNITED STATES PATENTS
| | | | |
|---|---|---|---|
| 2,808,316 | 10/1957 | Hall | 260/94.9 P |
| 3,349,070 | 10/1967 | Thayer | 260/86.7 |
| 3,558,577 | 1/1971 | Fleck | 260/87.3 |
| 3,708,658 | 1/1973 | Hopkins | 260/86.7 |
| 3,794,471 | 2/1974 | Latinen | 260/94.9 P |
| 3,801,286 | 4/1974 | Anolick et al. | 260/94.9 P |

FOREIGN PATENTS OR APPLICATIONS
| | | | |
|---|---|---|---|
| 860,454 | 2/1961 | United Kingdom | 260/94.9 P |
| 861,444 | 2/1961 | United Kingdom | 260/94.9 P |
| 991,397 | 5/1965 | United Kingdom | 260/94.9 P |

Primary Examiner—Joseph L. Schofer
Assistant Examiner—A. Holler
Attorney, Agent, or Firm—Johnston, Keil, Thompson & Shurtleff

[57] ABSTRACT

Copolymers of ethylene with 10 to 98 percent by weight of conventional comonomers are made by copolymerization in aqueous dispersion, at least a part of the heat of polymerization being removed by evaporation of the ethylene. The vapors are cooled by a cooling medium by heat exchange, in a cooling zone situated above the polymerization vessel and communicating with the latter, the hot vapors being fed to the upper end of the cooling zone, the cooled vapors returning to the polymerization vessel, so that the vapors are cooled by the cooling medium while they are flowing downward.

7 Claims, 1 Drawing Figure

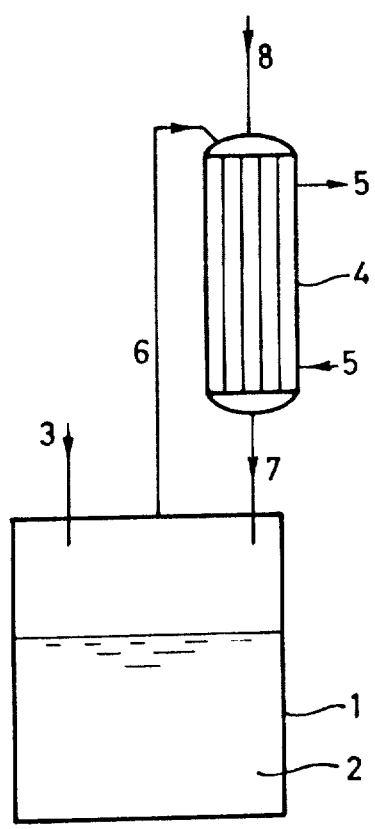

REMOVING HEAT OF REACTION IN COPOLYMERIZATION OF ETHYLENE IN AQUEOUS DISPERSION

It is known that valuable polymer dispersions can be made by copolymerizing ethylene in aqueous dispersion. The ethylene is fed as a vapor and the reaction is conducted at relatively high pressure. In operating the process on a commercial scale it is desirable to remove at least a part of the heat of reaction by evaporative cooling. But in the operation of evaporative coolers of conventional type it has been found that the even course of the reaction is repeatedly disturbed by choking of the cooler and of the tubes conveying the condensate. The trouble is presumably due to the formation of ethylene hydrate crystals, which are stable under the high pressures and low temperatures prevailing in the system, the low temperatures being produced by the cooling medium which is used. At a pressure of 41 bars, for example, the decomposition temperature of ethylene hydrate is 16°C.

The object of the present invention is to prevent or restrain these disturbing effects and to remove the heat of polymerization as smoothly and evenly as possible. The problem is solved by the claimed process.

The method according to the invention can be used in the copolymerization of ethylene with 10 to 98 percent by weight, preferably 60 to 95 percent by weight, of the usual comonomers. Comonomers which can be used include vinyl esters or organic fatty acids (alkanoic acids) containing 1 to 12 carbon atoms in the alkyl group, for example vinyl acetate or vinyl propionate; olefinically unsaturated carboxylic acids with 1 to 12 carbon atoms, for example acrylic acid, methacrylic acid, maleic acid or fumaric acid; esters of these acids, for example methyl acrylate, methyl methacrylate, ethyl acrylate, butyl acrylate, ethylhexyl acrylate or the maleic acid diesters or half-esters of methanol or butanol; amides of these acids, such as acrylamide or methylolacrylamide; nitriles of these acids, such as acrylonitrile or methacrylonitrile; vinyl chloride, vinylethylketone or vinylsulfonic acid, hydroxyalkyl acrylate or bifunctional acrylic esters or vinyl compounds, or mixtures of these monomers.

The polymerization is conducted in aqueous dispersion in conventional autoclaves. The known emulsifying and dispersing agents can be used, for example ionic and non-ionic emulsifiers and protective colloids, such as those which have been described in detail in Houben-Weyl "Methoden der organischen Chemie", vol. XIV/1, "Makromolekulare Stoffe", Georg-Thieme-Verlag, Stuttgart 1961 on pages 192 to 208 and 411 to 420. As water-soluble free radical-forming polymerization catalysts there can be used in particular persulfates, such as potassium, sodium and ammonium persulfates; hydrogen peroxide and azo compounds which readily decompose to form radicals, such as azoisobutyronitrile; perborates or the usual redox catalyst systems. The usual modifiers and buffers can if desired be added.

The polymerization is preferably conducted at temperatures between 30° and 85°C. The pressure used depends on the fraction of ethylene desired in the product copolymer. For copolymers containing a low ethylene fraction the reaction pressure need be no higher than 5 to 10 bars. On the other hand to obtain a very large ethylene fraction in the product copolymer it is necessary to use pressures of 50 bars or more. During the operation of the process the ethylene pressure is usually held constant, so that further ethylene vapor is supplied at the rate of which the polymerization proceeds. The ethylene dissolves readily in the comonomers present in the dispersion. If desired the comonomers can also be added semi-continuously during the polymerization.

During the polymerization heat is evolved, causing ethylene to evaporate from the aqueous dispersion. The vapor space above the dispersion contains, in addition to ethylene vapor, also small amounts of water vapor and comonomer vapors, the quantities depending on the nature of the dispersion. This of course also helps to some extent in removing the heat of polymerization. The vapors flow through an open passage into a cooling zone situated above the polymerization vessel. According to the invention the system is arranged so that the vapors enter the cooling zone at its upper end. For example the cooling zone can take the form of a vertically positioned tube-bundle heat-exchanger. The vapors enter the heat-exchanger at the top and flow downward through the tubes, in which they are cooled by a cooling medium which surrounds the tubes. The cooling medium can be a conventional liquid coolant whose freezing point is below the working temperature of the process, for example a water-glycol mixture, methanol, an aqueous solution of calcium chloride, or liquid ammonia. In the cooling zone the ethylene vapors are in indirect contact with the cooling medium, that is to say through the walls of the tubes, so that heat exchange takes place. If the polymerization is conducted at ethylene pressures above the critical pressure (for pure ethylene this is approximately 51 bars, but in the presence of small quantities of water vapor or comonomer vapor it can be a little higher) it is clear that condensation cannot take place. Nevertheless, it has surprisingly been found that even in this case sufficient heat of polymerization is removed.

Preferably, however, the polymerization is conducted below the critical pressure. In this case the vapors are condensed by the indirect cooling, provided that the temperature of the cooling medium is below the condensation temperature of the vapors at the prevailing pressure. The condensate flows back into the polymerization vessel.

In a special embodiment of the method according to the invention liquid comonomers are fed continuously to the upper end of the cooling zone. It has been found that under these conditions heat is removed by the cooling medium, even if its temperature is above the condensation temperature of the ethylene under the prevailing pressure. The explanation for this could be that the ethylene vapor condenses by becoming dissolved in the liquid comonomers in the tubes, the resulting solution losing heat to the cooling medium outside the tubes. Polymerization proceeds even more smoothly, so that for example in batch operation it has been found possible to polymerize for 10 hours or even longer without encountering difficulties.

The process according to the invention will now be described in greater detail with reference to the accompanying drawing.

A polymerization vessel 1 contains the aqueous dispersion 2. Ethylene vapor is fed to the polymerization vessel through an ethylene feed line 3. A heat-exchanger 4 is mounted above the polymerization vessel, a cooling medium 5 flowing through the heat-exchanger. Ethylene vapor rises from the polymerization vessel through a riser 6 and enters the heat-exchanger at its upper end. Cooled vapor or condensate returns to the polymerization vessel through a return line 7. Connected to the top of the heat-exchanger there is an upper feed line 8 through which comonomers can be introduced.

The method according to the invention enables the heat of reaction produced by ethylene copolymerization in aqueous dispersion to be removed very evenly and smoothly, making it considerably simpler to conduct this kind of polymerization on a commercial scale. It is specially surprising that the vapors flow so evenly and smoothly, making the process easily controllable, even though the polymerization is conducted close to the critical pressure. If desired some of the heat of polymerization can be removed by jacket cooling in the conventional manner.

The resulting polymer dispersion can be used for the usual purpose, for example as textile assistants, as binders in papercoating formulations, paints, nonwoven fabrics, as raw materials in the manufacture of adhesives and as additives to hydraulic binders.

In the following Examples the parts and percentages are by weight.

EXAMPLE

The polymerization reactor was a pressure vessel made of $V_4A$ steel and equipped with a stirrer and a reflux cooler mounted above the reaction vessel, as shown in the drawing. The cooler was a tube-bundle heat-exchanger. Emulsion copolymerization was conducted with a feed of monomer. The reaction vessel was charged with a mixture consisting of:

66.4 parts of water
3.75 parts of polyvinyl alcohol
1.5 parts octylphenol . 25 ethylene oxide
0.375 parts potassium persulfate
0.6 parts vinyl acetate.

After flushing the vapor space several times with ethylene, the temperature of the mixture was adjusted to 40°C with the help of a jacket. The ethylene pressure was adjusted to 41 bars. Outside the reactor, a solution A was prepared, consisting of:

12.0 parts water
0.2 parts sodium acetate
0.1 part sodium formaldehyde sulfoxylate.

1.5 parts of solution A was pumped into the reactor to start the reaction. After 15 minutes vinyl acetate was fed into the reactor through the reflux cooler, altogether 59.4 parts of vinyl acetate being introduced continuously and evenly during a period of 4 hours. The remainder of solution A was pumped directly into the reaction vessel, the solution flowing continuously and evenly into the vessel in the course of 4½ hours. The ethylene consumed during the reaction was continuously replenished. The heat of reaction was removed in the heat-exchanger by the cooling medium, whose temperature rose during the reaction from −2 to +15°C, due to the increasing temperature of the reaction mixture.

On completion of the reaction the cooler was shut down and the pressure released from the reaction vessel. The fully polymerized dispersion was removed from the reactor and found to contain 17.5 percent of ethylene units in the product copolymer.

COMPARATIVE EXAMPLE A

The experimental conditions at the beginning of polymerization were as described in the above Example, except for the fact that the vapor was fed into the heat exchanger differently. In this case the vapor from the reaction vessel was fed to the lower distributor cap of the tube-bundle heat-exchanger, that is to say the cap through which the liquid (vinyl acetate fed into the top of the heat-exchanger, mixed with condensate) returns to the reactor.

Polymerization was continued for approximately 1 hour as described in the Example. Toward the end of the hour the return line from the lower distributor cap of the heat-exchanger became choked with condensate and vinyl acetate (fed into the top of the heat-exchanger) saturated with ethylene condensate. Cooling stopped. After a time liquid overflowed the lower cap into the vapor riser through which vapor was flowing upward from the reaction vessel into the lower cap, the downward-flowing liquid and the upward-flowing vapor impeding each other. Nevertheless some of the liquid must have reached the interior of the reactor, because cooling started again to a certain extent. The temperature of the mixture in the reactor rose and continued rising, overloading the heat-exchanger and preventing effective temperature control. The tubes in the heat exchanger began to fill up with condensate. After a further hour all the monomer in the reactor was used up. The temperature of the mixture reached a maximum of about 80°C and then began to fall. The feed of ethylene was stopped, the pressure in the reactor nevertheless remaining at 41 bars. There was a risk of the choked material becoming detached and large amounts of monomer passing into the reactor, causing the reaction to run away.

the experiment was therefore interrupted at this point and, after releasing the pressure from the reactor, the return line was dismantled as quickly as possible. The outlet opening of the lower distributor cap of the heat-exchanger was found to be plugged with ice over its entire cross-section. The ice had the consistency and appearance of loosely packed snow. It contained occluded ethylene. The lower end of the return line was coated inside with a layer of ice approximately 10 mm thick. The riser line for the vapor was choked with a plug obstructing half the diamter.

COMPARATIVE EXAMPLE B

As Comparative Example A, but in this case the vinyl acetate was not fed to the top of the heat-exchanger but directly into the reaction vessel. Polymerization proceeded for about 1 hour as described in the Example, after that as in Comparative Example A. However, conditions were more critical, because the feed of vinyl acetate into the reacting mixture was not being impeded. The temperature therefore climbed much faster and the experiment was interrupted after a further 20 minutes.

COMPARATIVE EXAMPLE C

As Comparative Example B, but in this case the return line for the condensate had been removed and replaced by a large-diameter connecting piece which also served as a riser for the vapor. The connecting piece had the same diameter as the heat-exchanger, so that vapor and condensate did not appreciably interfere with each other.

Polymerization proceeded for approximately 2 hours as described in the Example. At the end of the 2 hours the connecting piece between the reactor and the heat-exchanger had become so choked with deposits, reducing its cross-section, that the process then proceeded as described in Comparative Example B.

We claim:

1. Method for manufacturing copolymers of ethylene with 10 to 98 percent by weight of one or more of a vinyl ester of an organic alkanoic acid containing 1 to 12 carbon atoms in the alkyl group, an olefinically unsaturated carboxylic acid with 1 to 12 carbon atoms, an alkyl ester of said olefinically unsaturated acid, an amide of said olefinically unsaturated acid, a nitrile of said olefinically unsaturated acid, vinyl chloride, vinylethylketone, vinylsulfonic acid, or a hydroxyalkyl acrylate, by polymerization thereof in aqueous dispersion, at least a part of the heat of polymerization being removed by evaporation of the ethylene, the ethylene vapors being cooled by a cooling medium, by indirect heat exchange, in an indirect heat exchanger in a cooling zone situated above the polymerization vessel and in communication with the latter, the cooled vapors being returned to the polymerization vessel, wherein the vapors are fed to the upper end of the cooling zone and cooled while they are flowing downward.

2. A method as claimed in claim 1, wherein copolymers of ethylene with 60 to 95 percent by weight of co-monomers are made.

3. A method as claimed in claim 1, wherein polymerization is conducted at a pressure below the critical pressure of ethylene.

4. A method as claimed in claim 3, wherein the vapors are cooled by indirect heat exchange with a cooling medium, through tubes, the temperature of the cooling medium being below the condensation temperature of the ethylene at the prevailing pressure, so that the vapors are condensed.

5. A method as claimed in claim 1, wherein liquid co-monomers are fed continuously or intermittently to the upper end of the cooling zone during the polymerization.

6. A method as claimed in claim 5, wherein the vapors condense by becoming dissolved in liquid comonomers fed to the upper end of the cooling zone, the temperature of the cooling medium being above the condensation temperature of the ethylene under the prevailing pressure.

7. A method as claimed in claim 1, wherein polymerization is conducted at a pressure between 5 and 50 bars.

* * * * *